United States Patent
Chien et al.

(10) Patent No.: US 6,793,722 B2
(45) Date of Patent: Sep. 21, 2004

(54) INKJET INK COMPOSITION WITH HIGH CHROMA

(75) Inventors: Chia-Hsin Chien, Taoyuan (TW); In-Shan Sir, Kaohsiung (TW); Yu-Ting Lin, Taipei (TW)

(73) Assignee: Benq Corporation, Taoyuan (TW)

( * ) Notice: Subject to any disclaimer, the term of this patent is extended or adjusted under 35 U.S.C. 154(b) by 32 days.

(21) Appl. No.: 10/326,191

(22) Filed: Dec. 20, 2002

(65) Prior Publication Data

US 2003/0136299 A1 Jul. 24, 2003

(30) Foreign Application Priority Data

Dec. 25, 2001 (TW) .......................................... 90132240

(51) Int. Cl.[7] .............................................. C09D 11/02
(52) U.S. Cl. ................ 106/31.27; 106/31.5; 106/31.51; 106/31.52; 106/31.6; 106/31.77
(58) Field of Search .......................... 106/31.27, 31.5, 106/31.51, 31.52, 31.6, 31.77

(56) References Cited

U.S. PATENT DOCUMENTS

| | | | |
|---|---|---|---|
| 4,334,878 A | | 6/1982 | Cutler et al. .................. 524/88 |
| 4,559,059 A | | 12/1985 | Su ................................ 9/507 |
| 4,631,085 A | | 12/1986 | Kawanishi et al. ....... 106/31.98 |
| 4,713,113 A | | 12/1987 | Shimada et al. ........... 106/31.5 |
| 4,737,190 A | | 4/1988 | Shimada et al. .......... 106/31.48 |
| 5,108,504 A | | 4/1992 | Johnson et al. .......... 106/31.37 |
| 5,451,251 A | | 9/1995 | Mafune et al. ............... 106/22 |
| 5,560,766 A | * | 10/1996 | Gundlach ................. 106/31.27 |
| 5,601,639 A | | 2/1997 | Myers et al. ............. 106/31.27 |
| 5,743,945 A | | 4/1998 | Yamashita et al. ........ 106/31.58 |
| 5,749,951 A | | 5/1998 | Yoshiike et al. .......... 106/31.27 |
| 5,766,326 A | * | 6/1998 | Gundlach et al. ......... 106/31.47 |
| 5,772,743 A | * | 6/1998 | Gundlach et al. ......... 106/31.27 |
| 5,925,177 A | | 7/1999 | Carreira et al. ........... 106/31.43 |
| 5,980,623 A | | 11/1999 | Hiraoka et al. ........... 106/31.49 |
| 5,997,623 A | * | 12/1999 | Lin ........................... 106/31.58 |
| 6,054,505 A | * | 4/2000 | Gundlach et al. ............ 523/160 |
| 6,698,875 B2 | | 3/2004 | Onishi et al. ................ 347/100 |
| 2002/0005884 A1 | | 1/2002 | Onishi et al. ................ 347/100 |
| 2002/0147251 A1 | | 10/2002 | Ohta et al. .................... 523/161 |
| 2003/0116056 A1 | | 5/2003 | Sir et al. .................. 106/31.27 |
| 2003/0127018 A1 | | 7/2003 | Shen et al. ............... 106/31.27 |
| 2003/0164114 A1 | | 9/2003 | Kitayama et al. ......... 106/31.46 |

FOREIGN PATENT DOCUMENTS

| | | |
|---|---|---|
| EP | 0 059 827 | 9/1982 |
| JP | 59001580 A | 1/1984 |
| JP | 61-176677 | 8/1986 |
| JP | 62-25171 | 2/1987 |
| WO | 99/55955 | 11/1999 |

OTHER PUBLICATIONS

Derwent abstract for CN 1434085 A, 2 pages total (Aug. 2003).

* cited by examiner

*Primary Examiner*—Helene Klemanski
(74) *Attorney, Agent, or Firm*—Ladas & Parry

(57) ABSTRACT

Inkjet ink composition with high chroma. The inkjet ink composition includes 0.1 to 15 weight % of Acid Red 92; at least one red colorant other than Acid Red 92; and an aqueous solution medium. By means of the addition of Acid Red 92, the chroma of magenta color of the ink composition is increased.

36 Claims, 4 Drawing Sheets

A series: without Acid Red 92
B series: with Acid Red 92

A series: without Acid Red 92
B series: with Acid Red 92

E series: without Acid Red 92
F series: with Acid Red 92

G series: without Acid Red 92
H series: with Acid Red 92

INKJET INK COMPOSITION WITH HIGH CHROMA

BACKGROUND OF THE INVENTION

1. Field of the Invention

The present invention relates to an inkjet ink composition, and more particularly to a magenta inkjet ink composition with high chroma.

2. Background of the Invention

Generally, four kinds of ink are required for a color inkjet printing machine, that is, magenta ink, cyan ink, yellow ink, and black ink. In recent years, light color inks including light magenta, light cyan, and light yellow have been developed for inkjet printing, giving more plentiful colors.

Water soluble (water-based) dye has generally poor light-fastness and water-fastness. Thus, when different colorants are matched, in addition to chroma, good light-fastness and water-fastness must also be considered. The following colorants exhibit superior light-fastness and water-fastness and can increase the inkjet printing quality. Suitable magenta colorants include Reactive Red 180, Direct Red 75, Direct Red 227, Magenta 377, Pigment Red 122, Pigment Red 112, Pigment Red 184, Pigment Red 178, and Pigment Red 188. Suitable cyan colorants include Direct Blue 199, Direct Blue 86, Direct Blue 87, Acid Blue 93, and Pigment Blue 15:3. Suitable yellow colorants include Direct Yellow 132, Direct Yellow 86, Pigment Yellow 74, Pigment Yellow 83, and Pigment Yellow 13.

Color can be specified by two systems: color appearance system and color mixing system. Color appearance system is a system obtained from collecting data of actual colored objects and systematically generalizing the data. Examples include the Ostwald color system, the Munsell color system, and the DIN color system. Color mixing system is based on the principle that primary color stimuli can be matched to generate various colors. Presently, the most important color mixing system is the CIE calorimetric system, which measures color instrumentally. For example, the Munsell color system was developed by Munsell, an American painter, and is the most famous system, describing color by hue, value, and chroma. For the CIE calorimetric system, the color stimuli (stimuli X, Y, and Z) and sensation of color are caused by the incorporation of light sources, objects, and observers. Color space is defined by three values L*, a*, and b*. L* indicates the lightness of a color, a* the hue, and b* the chroma of a color. a* ranges from −a (green) to +a (red), and b* ranges from −b (blue) to +b (yellow). In 1976, the CIE system further incorporates hue angle ($h^0$) and chroma (C*) (see Formula 1 and 2). In the CIELAB color space, color difference (ΔE) indicates the color difference between two color samples (see Formula 3). The greater the ΔE, the greater the color difference between two color samples. OD (optical density), also represented by absorbancy, is defined by Formula 4. After a light with intensity $I_0$ irradiates an object, the residual intensity is I.

$$h^0 = \tan^{-1}(b^*/a^*) \quad \text{Formula 1}$$

$$C^* = (a^{*2} + b^{*2})^{1/2} \quad \text{Formula 2}$$

$$\Delta E = (\Delta L^{*2} + \Delta a^{*2} + \Delta b^{*2})^{1/2} \quad \text{Formula 3}$$

$$OD = \log(I_0/I) \quad \text{Formula 4}$$

In the above formula 2, the C* (chroma) value is used to determine the brightness of a color. A larger C* represents brighter color, broader color space, and plentiful color.

SUMMARY OF THE INVENTION

One object of the present invention is to provide a magenta inkjet ink composition with high chroma.

Another object of the present invention is to provide a color inkjet ink composition including the above-mentioned magenta ink.

To achieve the above-mentioned objects, the magenta inkjet ink composition of the present invention includes a predetermined ratio of Acid Red 92; at least one red colorant other than Acid Red 92; and an aqueous solution medium. Acid Red 92 has broader color space and higher brightness. Thus, the chroma of magenta color of the ink composition is increased by the addition of Acid Red 92, and the color space is also increased.

In addition to the above-mentioned dye set and the aqueous solution medium, the magenta inkjet ink composition of the present invention can further include other additives. The additives can be, but are not limited to, organic solvents, surfactants, pH buffer additives, chelating agents, biocides, humectants, preservatives, or UV blockers.

In addition, the magenta inkjet ink composition of the present invention can be mixed with any conventional cyan ink and yellow ink for use in color inkjet ink printing.

DETAILED DESCRIPTION OF THE INVENTION

Figure 1:
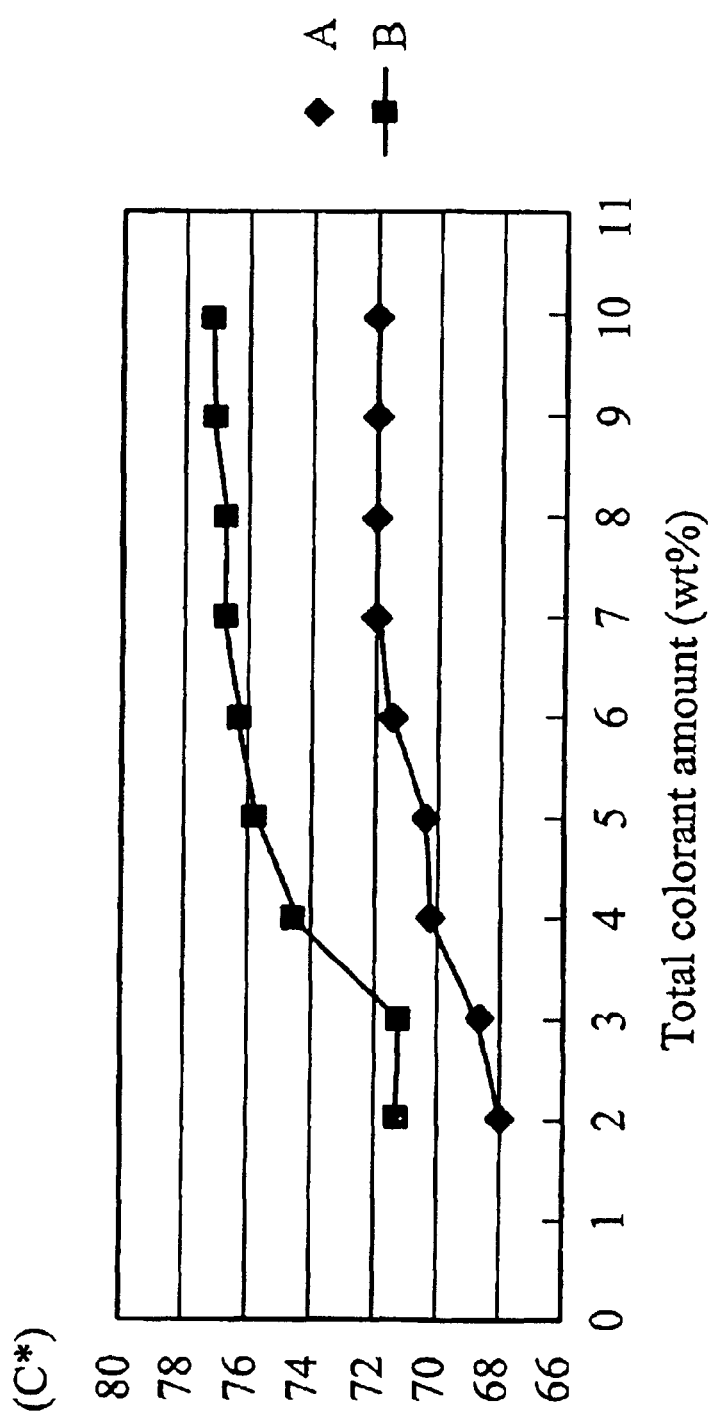
FIGS. 1 to 4 show chroma comparison between the ink with Acid Red 92 (B, D, F, H series samples) and ink without Acid Red 92 (A, C, E, G series samples).

Generally, any color ink used in color inkjet printers includes at least two kinds of colorant in order to have better color and prevent nozzle clogging which may result from one colorant-based ink. The present invention uses at least two kinds of red colorant to prevent this problem. Color brightness and color space are also taken into account.

Acid Red 92 has better color appearance and broader color space compared with general red colorants in the market, and is Acid Red 92 has fluorescent properties; thus, the color is relatively bright and brilliant. This can increase the overall color space and color brightness.

A single Acid Red 92 can also generate high chroma color. However, for the overall inkjet ink appearance, it cannot exhibit natural colors, such as skin color. Thus, in order to have high chroma and provide a natural color appearance, the present invention mixes Acid Red 92 dye with at least one kind of different red colorant. For example, Acid Red 92 can be mixed with at least one of the following red colorants. Suitable red colorants include Reactive Red 180, Direct Red 75, Direct Red 227, Reactive Red 158, Reactive Red 159, Reactive Red 23, Magenta 377, Pigment Red 122, Pigment Red 112, Pigment Red 184, Pigment Red 178, and Pigment Red 188.

According to the present invention, by means of addition of 0.1 to 15 weight % of Acid Red 92 accompanied by other red colorant, the chroma of magenta color can be increased by 0.1 to 70%. By means of addition of 3 to 5 weight % of Acid Red 92 accompanied by other red colorant, the chroma of magenta color can be increased by 2 to 50%.

In the ink composition of the present invention, preferably, each of the above colorants can be added in an amount of 0.1 to 15 weight %, most preferably 2 to 10 weight %, based on the total weight of the ink composition.

The ink composition of the present invention includes the above-mentioned colorants and an aqueous solution medium. The aqueous solution medium is present in an amount of 50–95 weight %, preferably 70–90 weight %, and water is the main solvent. In addition to water, the aqueous solution medium can further include a water-soluble or water-miscible organic solvent, such as cyclohexane, methanol, ethanol, ethylene glycol, diethylene glycol, triethylene glycol, polyethylene glycol, propylene glycol, butylene glycol, pentylene glycol, hexylene glycol, or polyhydroxy diols. The organic solvent can be added in an amount of 0.1 to 20 weight %, preferably 2 to 10 weight %, based on the weight of the medium.

The ink composition of the present invention can further include one or more kinds of surfactant added in an amount of 0.01 to 30 weight %, more preferably 2 to 10 weigh %, based on the weight of the medium. The surfactant can be anionic, cationic, non-ionic, or zwitterionic. Representative examples of suitable surfactants include 2-propanol, di-1,2-propylene glycol, 2-pyrrolidone, N-methyl-2-pyrrolidone, 2,4,7,9-tetramethyl-5-decyne-4,7-diol, 1,1,1-trimethylolpropane, polyethandiol, polypropandiol, EO/PO copolymer, BO/EO copolymer, sodium dioctyl sulfosuccinate, alkylene oxide adduct of acetylene glycol, polybutyl resin, cellulose derivatives, styrene/acrylic copolymer resin, maleic acid/styrene copolymer, or polymers containing both hydrophilic and hydrophobic segments.

Commercially available surfactants include A-102 from CYTEC, LF-4 from CYTEC, 1,3-BG from KYOWA, OG from KYOWA, BEPG from KYOWA, PD-9 from KYOWA, EP-810 from AIR PRODUCT, CT-141 from AIR PRODUCT, CT-151 from AIR PRODUCT, OT-75 from CYTEC, GPG from CYTEC, and OT-70PG from CYTEC.

The ink composition of the present invention can further include a humectant. The humectant is usually a low volatile liquid and is used to decrease evaporation. Also, the humectant has good miscibility with the main solution. The addition of the humectant can prevent the ink at the nozzle of the ink cartridge from evaporation, which can generate precipitation and crystals, thus preventing clogging of the nozzle. Typical humectants used in the inkjet ink can be polyethylene glycol, diethylene glycol, or glycerol, added in an amount of 0.1 to 30 weight %, preferably 2 to 12 weight %, based on the weight of the medium.

The ink composition of the present invention can further include a pH buffer additive. The colorant can create ideal colors only within a suitable pH range. The pH buffer additive suitable for use can be diethanolamine, triethanolamine, hydroxides of alkali metal such as lithium hydroxide, sodium hydroxide, and potassium hydroxide, ammonium hydroxide, and carbonates of alkali metals such as lithium carbonate, sodium carbonate, and potassium carbonates.

The ink composition of the present invention can further include a chelating agent. The addition of the chelating agent can prevent generation of crystalline salt. This prevents coagulation of particles and clogging of the nozzle of the ink cartridge. Chelating agents suitable for use include sodium ethylenediaminetetraacetate, trisodium nitrilotriacetate, hydroxyethyl ethylenediamine trisodium acetate, diethylentriamino pentasodium acetate, and uramil disodium acetate.

In addition, the ink composition of the present invention can further include a UV-blocker to block the absorbance of UV light and increase the light-fastness of the colorant. A biocide or preservative can be added to inhibit the growth of microorganisms. A dispersant can be added to increase the dispersing ability of the additives in the ink.

The magenta inkjet ink composition of the present invention can be mixed with any conventional cyan ink and yellow ink to obtain a color inkjet ink. Suitable cyan colorants used in cyan ink include Direct Blue 199, Direct Blue 86, Direct Blue 165, Direct Blue 120, Direct Blue 87, Direct Blue 165, Acid Blue 93, and Pigment Blue 15:3. Suitable yellow colorant used in yellow ink includes Direct Yellow 132, Direct Yellow 12, Direct Yellow 27, Direct Yellow 86, Pigment Yellow 74, Pigment Yellow 83, and Pigment Yellow 13. When the magenta ink of the present invention is mixed with any of the above colorants, the overall color appearance is improved, the color space is broader, and the inkjet printing quality is enhanced.

The following examples are intended to illustrate the process and the advantages of the present invention more fully without limiting its scope, since numerous modifications and variations will be apparent to those skilled in the art.

EXAMPLE

Sample No. B1–B6, D1–D6, F1–F6, and H1–H6

The ink composition included the following ingredients: Acid Red 92 available from Orient, Reactive Red 180 available from Bayer, Direct Red 75 available from Bayer, Reactive Red 159 available from Bayer, Pigment Red 122 available from Bayer, PEG200 (polyethylene glycol 200) available from U.C.C., 2-pyrrolidone available from DOW, 2-ethyl-2-hydromethyl-1,3-propanediol (EHMPD) available from Lancaster, SL-700 available from KYOWA, and propylene glycol.

Inkjet printing onto a commercially available plain paper (specification: Paperon Plain Paper A4 size 70 gsm) in a commercially available inkjet printer (HP 930C Printer) proceeded using the above ink composition. The chroma value ($C^*$) was measured at optimal conditions.

COMPARATIVE EXAMPLE

Sample No. A1–A6, C1–C6, E1–E6, and G1–G6

The same procedures described in the Example were employed except that Acid Red 92 was not added.

Figure 2:
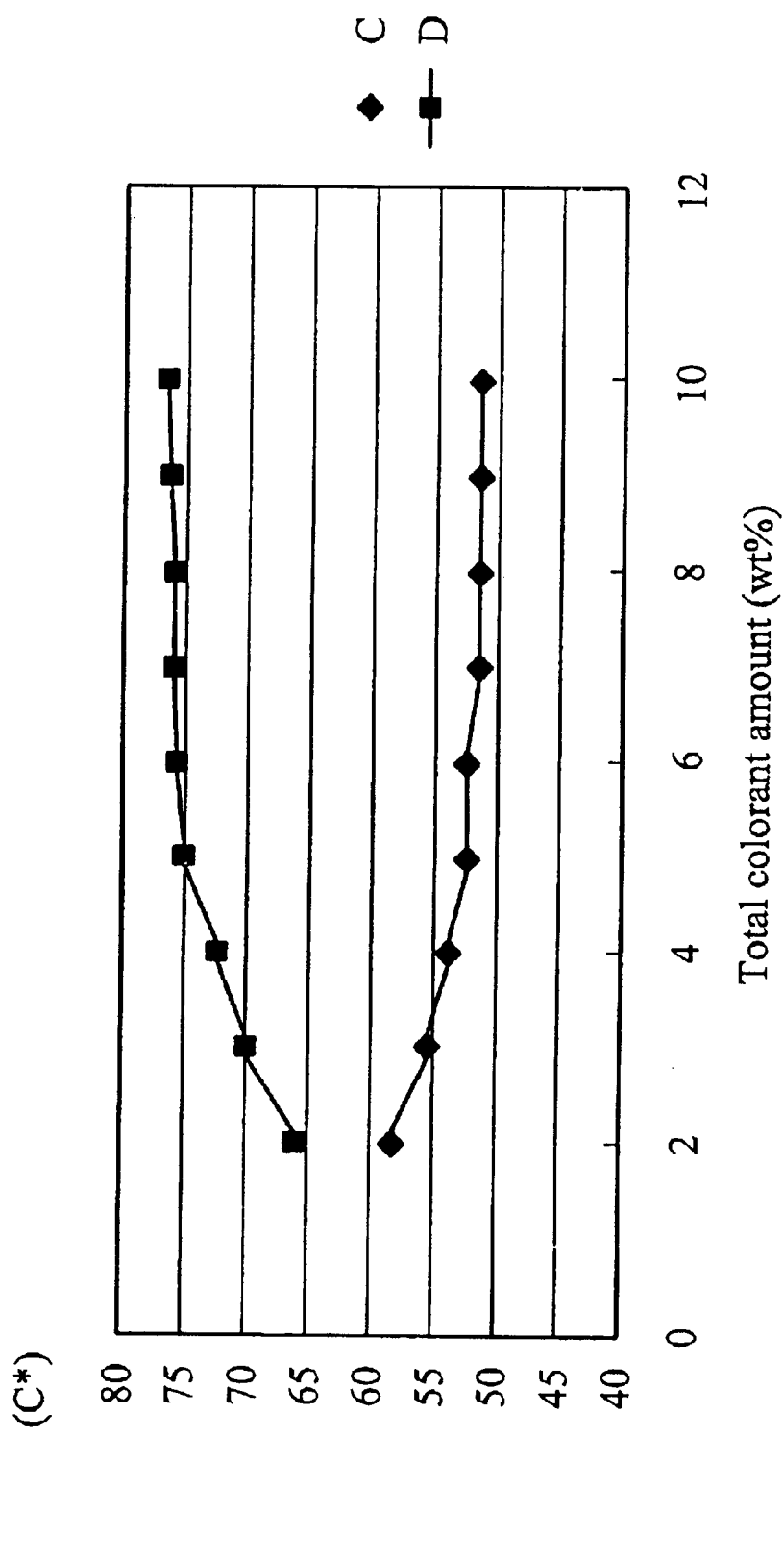
Figure 3:
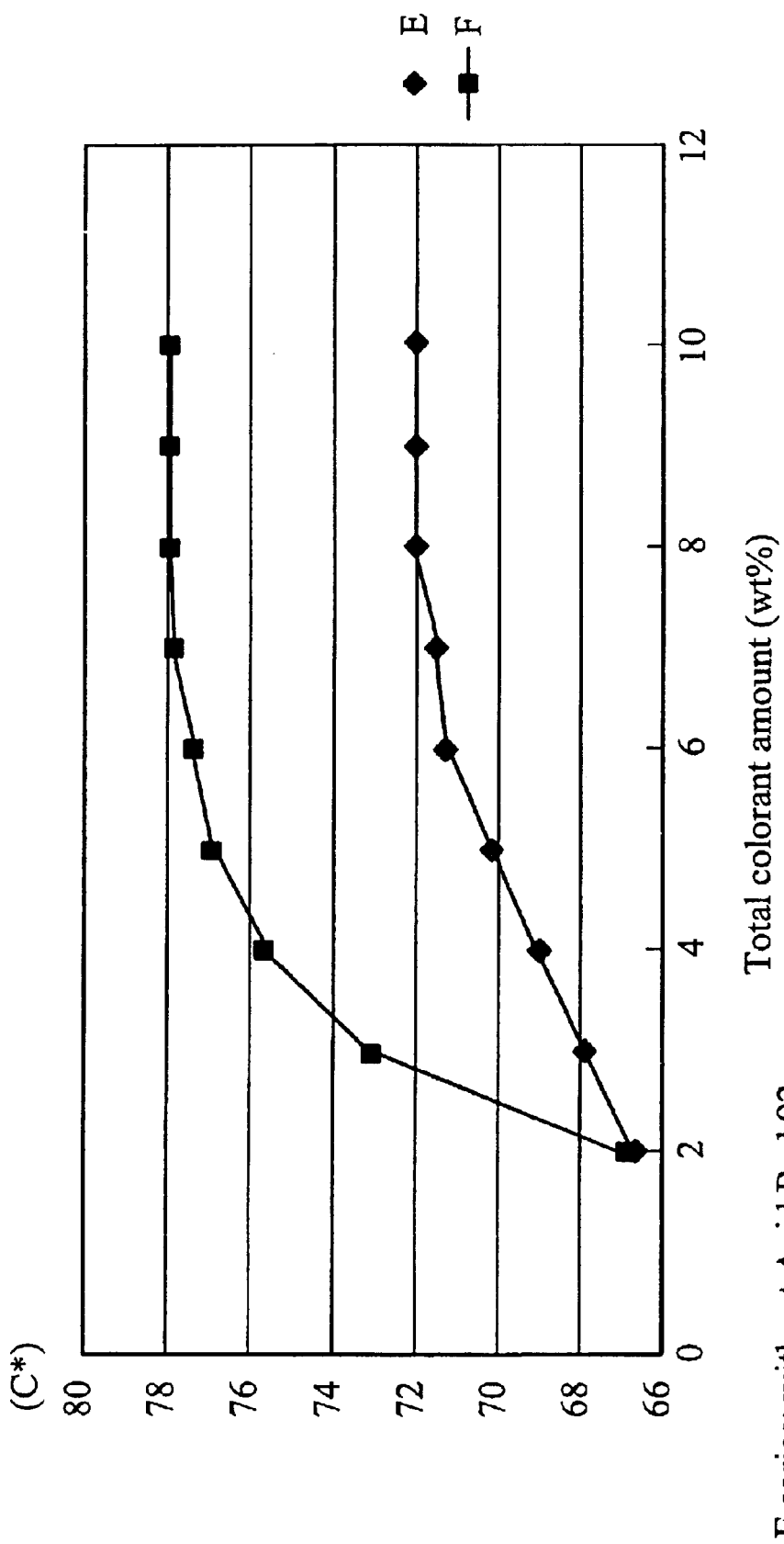
Figure 4:
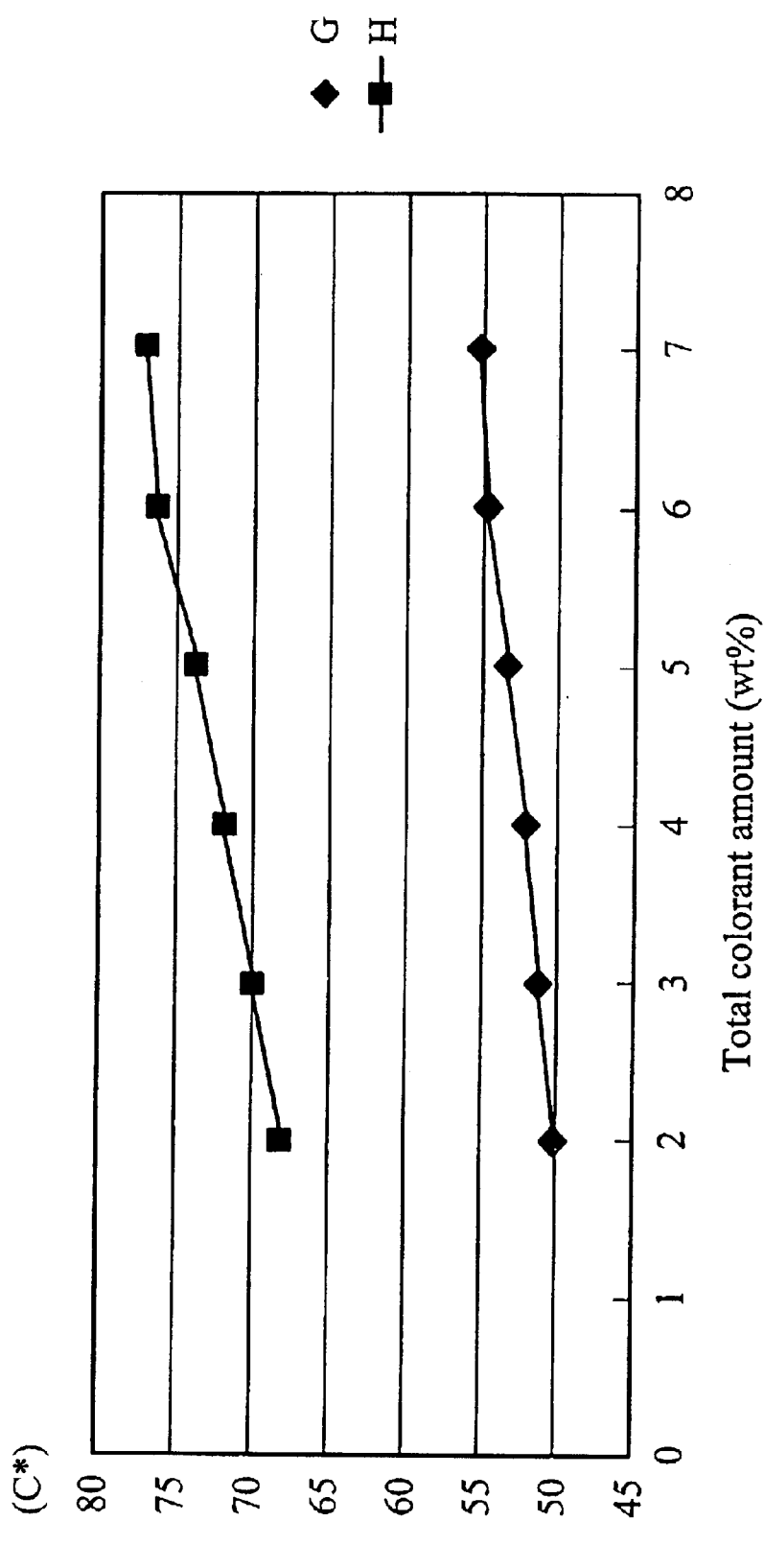

FIGS. 1 to 4 are the chroma vs. colorant amount diagrams, in which the abscissa coordinate represents the total colorant amount (wt %) and the longitudinal coordinate the chroma ($C^*$). With the same amount of total colorant amount, a higher chroma indicates a greater color space. This also indicates more plentiful color, increased color brightness, and better printed images.

Other results of the Example and Comparative Example are shown in Tables 1 to 5. The total colorant amount is the same for the Example (the present invention) and the Comparative Example.

TABLE 1

| | | A1 | A2 | A3 | A4 | A5 | A6 | B1 | B2 | B3 | B4 | B5 | B6 |
|---|---|---|---|---|---|---|---|---|---|---|---|---|---|
| magenta dye | Acid Red 92 | 0 | 0 | 0 | 0 | 0 | 0 | 0.1 | 1.0 | 2.0 | 3.0 | 5.0 | 7.0 |
| | Reactive Red 180 | 2.0 | 3.0 | 4.0 | 5.0 | 7.0 | 9.0 | 1.9 | 2.0 | 2.0 | 2.0 | 2.0 | 2.0 |
| | PEG200 | 5.0 | 5.0 | 5.0 | 5.0 | 5.0 | 5.0 | 5.0 | 5.0 | 5.0 | 5.0 | 5.0 | 5.0 |
| | 2-pyrrolidone | 5.0 | 5.0 | 5.0 | 5.0 | 5.0 | 5.0 | 5.0 | 5.0 | 5.0 | 5.0 | 5.0 | 5.0 |
| | EHMPD | 5.0 | 5.0 | 5.0 | 5.0 | 5.0 | 5.0 | 5.0 | 5.0 | 5.0 | 5.0 | 5.0 | 5.0 |
| | biocide SL-700 (KYOWA) | 0.7 | 0.7 | 0.7 | 0.7 | 0.7 | 0.7 | 0.7 | 0.7 | 0.7 | 0.7 | 0.7 | 0.7 |
| | organic solvent | 5.0 | 5.0 | 5.0 | 5.0 | 5.0 | 5.0 | 5.0 | 5.0 | 5.0 | 5.0 | 5.0 | 5.0 |
| | 1,2-propylene diol | 2.0 | 2.0 | 2.0 | 2.0 | 2.0 | 2.0 | 2.0 | 2.0 | 2.0 | 2.0 | 2.0 | 2.0 |
| | water | 50–85% | 50–85% | 50–85% | 50–85% | 50–85% | 50–85% | 50–85% | 50–85% | 50–85% | 50–85% | 50–85% | 50–85% |
| | chroma (C*) | 67.99 | 68.63 | 70.21 | 70.34 | 71.89 | 71.91 | 68.21 | 71.28 | 74.64 | 75.86 | 76.82 | 77.18 |
| | hue angle | 356.54 | 358.5 | 0.47 | 2.75 | 2.97 | 3.23 | 354.34 | 355.37 | 356.63 | 357.34 | 0.72 | 0.85 |
| | integral color appearance* | ○ | Δ | Δ | Δ | Δ | Δ | ⊚ | ⊚ | ⊚ | ⊚ | ○ | ○ |

*Integral color appearance (for example, skin color appearance)
X: inferior, Δ: fair, ○: good, ⊚: excellent

TABLE 2

| | | C1 | C2 | C3 | C4 | C5 | C6 | D1 | D2 | D3 | D4 | D5 | D6 |
|---|---|---|---|---|---|---|---|---|---|---|---|---|---|
| magenta dye | Acid Red 92 | 0 | 0 | 0 | 0 | 0 | 0 | 1 | 2 | 3 | 4 | 6 | 8 |
| | Directive Red 75 | 2 | 3 | 4 | 5 | 7 | 9 | 1 | 1 | 1 | 1 | 1 | 1 |
| | PEG200 | 5.0 | 5.0 | 5.0 | 5.0 | 5.0 | 5.0 | 5.0 | 5.0 | 5.0 | 5.0 | 5.0 | 5.0 |
| | 2-pyrrolidone | 5.0 | 5.0 | 5.0 | 5.0 | 5.0 | 5.0 | 5.0 | 5.0 | 5.0 | 5.0 | 5.0 | 5.0 |
| | EHMPD | 5.0 | 5.0 | 5.0 | 5.0 | 5.0 | 5.0 | 5.0 | 5.0 | 5.0 | 5.0 | 5.0 | 5.0 |
| | biocide SL-700 (KYOWA) | 0.7 | 0.7 | 0.7 | 0.7 | 0.7 | 0.7 | 0.7 | 0.7 | 0.7 | 0.7 | 0.7 | 0.7 |
| | organic solvent | 5.0 | 5.0 | 5.0 | 5.0 | 5.0 | 5.0 | 5.0 | 5.0 | 5.0 | 5.0 | 5.0 | 5.0 |
| | 1,2-propylene diol | 2.0 | 2.0 | 2.0 | 2.0 | 2.0 | 2.0 | 2.0 | 2.0 | 2.0 | 2.0 | 2.0 | 2.0 |
| | water | 50–85% | 50–85% | 50–85% | 50–85% | 50–85% | 50–85% | 50–85% | 50–85% | 50–85% | 50–85% | 50–85% | 50–85% |
| | chroma (C*) | 58.03 | 55.14 | 53.52 | 52.18 | 52.14 | 51.32 | 66.07 | 69.73 | 72.14 | 74.83 | 75.67 | 76.10 |
| | hue angle | 3.85 | 6.13 | 8.45 | 10.25 | 1122 | 13.67 | 353.24 | 355.48 | 355.77 | 35728 | 35949 | 0.96 |
| | integral color appearance* | X | X | X | X | X | X | ⊚ | ⊚ | ⊚ | ○ | ○ | ○ |

*integral color appearance (for example, skin color appearance)
X: inferior, Δ: fair, ○: good, ⊚: excellent

TABLE 3

| | | E1 | E2 | E3 | E4 | E5 | E6 | F1 | F2 | F3 | F4 | F5 | F6 |
|---|---|---|---|---|---|---|---|---|---|---|---|---|---|
| magenta dye | Acid Red 92 | 0 | 0 | 0 | 0 | 0 | 0 | 0.1 | 1 | 2 | 3 | 5 | 7 |
| | Reactive Red 159 | 2 | 3 | 4 | 5 | 7 | 9 | 1.9 | 2 | 2 | 2 | 2 | 2 |
| | PEG200 | 5.0 | 5.0 | 5.0 | 5.0 | 5.0 | 5.0 | 5.0 | 5.0 | 5.0 | 5.0 | 5.0 | 5.0 |
| | 2-pyrrolidone | 5.0 | 5.0 | 5.0 | 5.0 | 5.0 | 5.0 | 5.0 | 5.0 | 5.0 | 5.0 | 5.0 | 5.0 |
| | EHMPD | 5.0 | 5.0 | 5.0 | 5.0 | 5.0 | 5.0 | 5.0 | 5.0 | 5.0 | 5.0 | 5.0 | 5.0 |
| | biocide SL-700 (KYOWA) | 0.7 | 0.7 | 0.7 | 0.7 | 0.7 | 0.7 | 0.7 | 0.7 | 0.7 | 0.7 | 0.7 | 0.7 |
| | organic solvent | 5.0 | 5.0 | 5.0 | 5.0 | 5.0 | 5.0 | 5.0 | 5.0 | 5.0 | 5.0 | 5.0 | 5.0 |
| | 1,2-propylene diol | 2.0 | 2.0 | 2.0 | 2.0 | 2.0 | 2.0 | 2.0 | 2.0 | 2.0 | 2.0 | 2.0 | 2.0 |
| | water | 50–85% | 50–85% | 50–85% | 50–85% | 50–85% | 50–85% | 50–85% | 50–85% | 50–85% | 50–85% | 50–85% | 50–85% |
| | chroma (C*) | 66.64 | 67.84 | 68.95 | 70.12 | 71.25 | 71.45 | 66.97 | 73.09 | 75.69 | 76.94 | 77.32 | 77.78 |
| | hue angle | 349.77 | 350.21 | 351.23 | 351.48 | 352.46 | 352.86 | 349.52 | 349.72 | 352.67 | 353.99 | 354.12 | 355.23 |
| | integral color appearance* | Δ | Δ | Δ | X | X | X | Δ | ⊚ | ⊚ | ⊚ | ⊚ | ○ |

*integral color appearance (for example, skin color appearance)
X: inferior, Δ: fair, ○: good, ⊚: excellent

TABLE 4

| | | G1 | G2 | G3 | G4 | G5 | G6 | H1 | H2 | H3 | H4 | H5 | H6 |
|---|---|---|---|---|---|---|---|---|---|---|---|---|---|
| magenta | Acid Red 92 | 0 | 0 | 0 | 0 | 0 | 0 | 0.1 | 1 | 2 | 3 | 5 | 7 |
| | Pigment Red 122 | 2 | 3 | 4 | 5 | 7 | 9 | 1.9 | 2 | 2 | 2 | 2 | 2 |

TABLE 4-continued

|  |  | Sample No. |  |  |  |  |  |  |  |  |  |  |
|---|---|---|---|---|---|---|---|---|---|---|---|---|
|  |  | G1 | G2 | G3 | G4 | G5 | G6 | H1 | H2 | H3 | H4 | H5 | H6 |
| dye | PEG200 | 5.0 | 5.0 | 5.0 | 5.0 | 5.0 | 5.0 | 5.0 | 5.0 | 5.0 | 5.0 | 5.0 | 5.0 |
|  | 2-pyrrolidone | 5.0 | 5.0 | 5.0 | 5.0 | 5.0 | 5.0 | 5.0 | 5.0 | 5.0 | 5.0 | 5.0 | 5.0 |
|  | EHMPD | 5.0 | 5.0 | 5.0 | 5.0 | 5.0 | 5.0 | 5.0 | 5.0 | 5.0 | 5.0 | 5.0 | 5.0 |
|  | biocide SL-700 (KYOWA) | 0.7 | 0.7 | 0.7 | 0.7 | 0.7 | 0.7 | 0.7 | 0.7 | 0.7 | 0.7 | 0.7 | 0.7 |
|  | organic solvent | 5.0 | 5.0 | 5.0 | 5.0 | 5.0 | 5.0 | 5.0 | 5.0 | 5.0 | 5.0 | 5.0 | 5.0 |
|  | 1,2-propylene diol | 2.0 | 2.0 | 2.0 | 2.0 | 2.0 | 2.0 | 2.0 | 2.0 | 2.0 | 2.0 | 2.0 | 2.0 |
|  | water | 50–85% | 50–85% | 50–85% | 50–85% | 50–85% | 50–85% | 50–85% | 50–85% | 50–85% | 50–85% | 50–85% | 50–85% |
|  | chroma (C*) | 50.26 | 51.25 | 52.15 | 53.41 | 54.62 | 55.11 | 68.32 | 70.23 | 71.98 | 73.84 | 76.46 | 77.11 |
|  | hue angle | 343.7 | 346.07 | 348.52 | 351.12 | 353.33 | 354.65 | 343.67 | 351.24 | 355.7 | 367.23 | 377.85 | 381.52 |
|  | integral color appearance* | X | Δ | Δ | Δ | Δ | X | Δ | Δ | ⊚ | ⊚ | ⊚ | ○ |

*integral color appearance (for example, skin color appearance)
X: inferior, Δ: fair, ○: good, ⊚: excellent

TABLE 5

| Comparative & Present Invention | A1&B1 | A2&B2 | A3&B3 | A4&B4 | A5&B5 | A6&B6 |
|---|---|---|---|---|---|---|
| Chroma Increase % | 0.32% | 3.86% | 6.31% | 7.85% | 6.86% | 7.32% |

| Comparative & Present Invention | C1&D1 | C2&D2 | C3&D3 | C4&D4 | C5&D5 | C6&D6 |
|---|---|---|---|---|---|---|
| Chroma Increase % | 13.85% | 26.45% | 34.79% | 43.40% | 45.12% | 48.28% |

| Comparative & Present Invention | E1&F1 | E2&F2 | E3&F3 | E4&F4 | E5&F5 | E6&F6 |
|---|---|---|---|---|---|---|
| Chroma Increase % | 0.50% | 7.74% | 9.78% | 9.73% | 8.52% | 8.85% |

| Comparative & Present Invention | G1&H1 | G2&H2 | G3&H3 | G4&H4 | G5&H5 | G6&H6 |
|---|---|---|---|---|---|---|
| Chroma Increase % | 35.93% | 37.03% | 38.02% | 38.25% | 39.98% | 39.92% |

From FIGS. 1 to 4 and Tables 1 to 5, it can be seen that with the addition of Acid Red 92, the magenta ink composition of the present invention has increased chroma and increased integral color space. This indicates more plentiful color and increased brightness of red colorant. The magenta ink composition of the present invention when used for inkjet printing provides excellent printed images.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A magenta inkjet ink composition suitable for providing magenta color of inkjet ink, comprising:
   a predetermined ratio of Acid Red 92;
   at least one red colorant other than Acid Red 92; and
   an aqueous solution medium,
   wherein the chroma of magenta color of the ink composition is increased by the addition of Acid Red 92.

2. The magenta inkjet ink composition as claimed in claim 1, comprising 0.1 to 15 weight % of Acid Red 92, wherein the chroma of magenta color is increased by 0.1 to 70% by the addition of Acid Red 92.

3. The magenta inkjet ink composition as claimed in claim 2, comprising 3 to 5 weight % of Acid Red 92, wherein the chroma of magenta color is increased by 2 to 50% by the addition of Acid Red 92.

4. The magenta inkjet ink composition as claimed in claim 1, wherein the red colorant other than Acid Red 92 includes Reactive Red 180.

5. The magenta inkjet ink composition as claimed in claim 1, wherein the red colorant other than Acid Red 92 includes Direct Red 75.

6. The magenta inkjet ink composition as claimed in claim 1, wherein the red colorant other than Acid Red 92 includes Reactive Red 159.

7. The magenta inkjet ink composition as claimed in claim 1, wherein the red colorant other than Acid Red 92 includes Pigment Red 122.

8. The magenta inkjet ink composition as claimed in claim 1, wherein the aqueous solution medium is present in an amount of 50 to 95 weight %.

9. The magenta inkjet ink composition as claimed in claim 1, wherein the aqueous solution medium includes at least one additive, and the additive is an organic solvent, surfactant, pH buffer additive, chelating agent, biocide, humectant, preservative, or UV-blocker.

10. The magenta inkjet ink composition as claimed in claim 9, wherein the medium includes 0.1 to 20 weight % of an organic solvent, based on the total weight of the ink composition.

11. The magenta inkjet ink composition as claimed in claim 9, wherein the medium includes 0.01 to 30 weight % of a surfactant, based on the total weight of the ink composition.

12. The magenta inkjet ink composition as claimed in claim 9, wherein the medium includes 0.1 to 30 weight % of a humectant, based on the total weight of the ink composition.

13. An inkjet ink composition, comprising:
   (1) a cyan ink;
   (2) a magenta ink, comprising a predetermined ratio of Acid Red 92, at least one red colorant other than Acid Red 92, and an aqueous solution medium; and (3) a yellow ink, wherein the chroma of magenta color of the ink composition is increased by the addition of Acid Red 92.

14. The inkjet ink composition as claimed in claim 13, wherein the magenta ink includes 0.1 to 15 weight % of Acid Red 92 and the chroma of magenta color is increased by 0.1 to 70% by the addition of Acid Red 92.

15. The inkjet ink composition as claimed in claim 14, wherein the magenta ink includes 3 to 5 weight % of Acid Red 92 and the chroma of magenta color is increased by 2 to 50% by the addition of Acid Red 92.

16. The inkjet ink composition as claimed in claim 13, wherein the red colorant other than Acid Red 92 includes Reactive Red 180.

17. The inkjet ink composition as claimed in claim 13, wherein the red colorant other than Acid Red 92 includes Direct Red 75.

18. The inkjet ink composition as claimed in claim 13, wherein the red colorant other than Acid Red 92 includes Reactive Red 159.

19. The inkjet ink composition as claimed in claim 13, wherein the red colorant other than Acid Red 92 includes Pigment Red 122.

20. The inkjet ink composition as claimed in claim 13, wherein the aqueous solution medium is present in an amount of 50 to 95 weight %.

21. The inkjet ink composition as claimed in claim 13, wherein the medium includes at least one additive, and the additive is an organic solvent, surfactant, pH buffer additive, chelating agent, biocide, humectant, preservative, or UV-blocker.

22. The inkjet ink composition as claimed in claim 21, wherein the medium includes 0.1 to 20 weight % of an organic solvent, based on the total weight of the ink composition.

23. The inkjet ink composition as claimed in claim 21, wherein the medium includes 0.01 to 30 weight % of a surfactant, based on the total weight of the ink composition.

24. The inkjet ink composition as claimed in claim 21, wherein the medium includes 0.1 to 30 weight % of a humectant, based on the total weight of the ink composition.

25. A method for increasing chroma of a magenta color, comprising providing a magenta inkjet ink composition, wherein the magenta inkjet ink composition includes a predetermined ratio of Acid Red 92; at least one red colorant other than Acid Red 92; and an aqueous solution medium, and wherein the chroma of magenta color of the ink composition is increased by the addition of Acid Red 92.

26. The method as claimed in claim 25, wherein the ink composition includes 0.1 to 15 weight % of Acid Red 92, and wherein the chroma of magenta color is increased by 0.1 to 70% by the addition of Acid Red 92.

27. The method as claimed in claim 26, wherein the ink composition includes 3 to 5 weight % of Acid Red 92, and wherein the chroma of magenta color is increased by 2 to 50% by the addition of Acid Red 92.

28. The method as claimed in claim 25, wherein the red colorant other than Acid Red 92 includes Reactive Red 180.

29. The method as claimed in claim 25, wherein the red colorant other than Acid Red 92 includes Direct Red 75.

30. The method as claimed in claim 25, wherein the red colorant other than Acid Red 92 includes Reactive Red 159.

31. The method as claimed in claim 25, wherein the red colorant other than Acid Red 92 includes Pigment Red 122.

32. The method as claimed in claim 25, wherein the aqueous solution medium is present in an amount of 50 to 95 weight %.

33. The method as claimed in claim 25, wherein the aqueous solution medium includes at least one additive, and the additive is an organic solvent, surfactant, pH buffer additive, chelating agent, biocide, humectant, preservative, or UV-blocker.

34. The method as claimed in claim 33, wherein the medium includes 0.1 to 20 weight % of an organic solvent, based on the total weight of the ink composition.

35. The method as claimed in claim 33, wherein the medium includes 0.01 to 30 weight % of a surfactant, based on the total weight of the ink composition.

36. The method as claimed in claim 33, wherein the medium includes 0.1 to 30 weight % of a humectant, based on the total weight of the ink composition.

* * * * *